United States Patent [19]

Godfrey

[11] Patent Number: 4,603,836
[45] Date of Patent: Aug. 5, 1986

[54] BALL VALVE WITH PRELOADED SEALS AND METHOD OF MANUFACTURE

[76] Inventor: Richard Godfrey, 21819 Lake End, Kingwood, Tex. 77339

[21] Appl. No.: 712,765

[22] Filed: Mar. 18, 1985

[51] Int. Cl.⁴ ............................................. F16K 5/06
[52] U.S. Cl. .................................... 251/315; 251/359
[58] Field of Search ................ 251/159, 170, 315, 359

[56] References Cited

U.S. PATENT DOCUMENTS

| | | | |
|---|---|---|---|
| 3,096,786 | 7/1963 | Rost | 251/315 X |
| 3,445,087 | 5/1969 | Priese et al. | 251/315 X |
| 3,486,733 | 12/1969 | Gordon, Jr. | 251/315 X |
| 3,661,355 | 5/1972 | Rawstron et al. | 251/315 X |
| 3,698,687 | 10/1972 | Kitamura | 251/315 |
| 3,807,692 | 4/1974 | Usab et al. | 251/315 |
| 4,147,326 | 4/1979 | Natalizia | 251/315 X |

Primary Examiner—A. Michael Chambers
Assistant Examiner—John C. Fox
Attorney, Agent, or Firm—Vaden, Eickenroht, Thompson & Boulware

[57] ABSTRACT

A ball valve includes a ball member with a flow passage therethrough, annular recessed surfaces around the ends of the ball member flow passages, resilient seals accommodated in part within the recessed surfaces, and a flow passage member, typically the housing, having annular grooves for accommodating the seals. The flow passage of the ball member, the inside perimeter of the seals, and the flow passage of the flow passage member are of substantially the same dimension. The seals each includes a cleft that opens to its inside perimeter for allowing seal flexing without axial movement when the ball member is rotated closed and the seals are flexed out of their respective recessed surfaces. A two-section mandrel having suitable retractable fingers is used to pre-load the seals when joined together through the ball member passage. The mandrel is sized so that the flow passage member is made in an injection mold around the mandrel, ball member and seals. The retractable fingers allow the mandrel to be separated and the sections removed after the molding step is completed.

3 Claims, 7 Drawing Figures

BALL VALVE WITH PRELOADED SEALS AND METHOD OF MANUFACTURE

BACKGROUND OF THE INVENTION

1. Field of the Invention

This invention relates to ball valves and more specifically to an improvement in a ball valve and a process for its manufacture.

2. Description of the Prior Art

Ball valves having a rotary member with a generally spherical shape are well-known. Such a valve is opened by rotation of the rotary ball member, which has a flow passage therethrough, so that it is aligned with the flow passage of the housing in which the rotary member is mounted. Conversely, the valve is closed by rotating the rotary member so that the passage through the rotary ball member is out of alignment with the passage of the housing in which the rotary member is mounted. Normally when the valve is closed, the passage through the rotary member is positioned 90° crosswise with the flow passage of the housing. In any event, when the rotary member is closed, a portion of its solid spherical surface blocks the flow passage through the housing.

The seal between the flow passage of the housing and the flow passage of the rotary member must be sufficiently good that there is no leakage therepast when the rotary member is either closed or open. If flow is expected in either direction, or just to provide back-up leakage security, appropriate seals are located at both passage ends of the rotary member.

Teflon forms a good seal material, although other deformable or yieldable materials have been successfully employed. Seals which are pre-loaded are more satisfactory than those that are not because they are more responsive following a movement of parts and because they generally conform more tightly to the adjacent surfaces, thereby creating a resistance to pressure leaks.

One popular ball valve of the type just described is disclosed in U.S. Pat. No. 3,807,692, Usab, et al., which is incorporated herein by reference for all purposes. The annular seals disclosed in this structure operate in conjunction with recess surfaces located abutting and surrounding the respective ends of the passage through the rotary ball member. When the rotary member is rotated closed, the seals are axially pushed out of their respective recess surfaces and away from the ball member. In order to permit this axial movement of the seals, the inside perimeter of the housing must be larger than the inside perimeter of the seals and the rotary ball member passage.

Moreover, the step passage dimension just described wherein the housing passage is larger than the rotary member passage allows a two-part core or mandrel to be inserted from either side of the passage of the ball member and the seals to provide preloading of the seals with respect to shoulders on the mandrel parts during the injection molding process of making the ball valve assembly. That is, while the seals are thus preloaded, the ball member, seals and mandrel is enclosed within an appropriate injection mold wherein the housing is formed. Once the molding is complete, the mandrel is then removed and the mold taken apart, thereby leaving the ball member and the pre-loaded seals in place.

As mentioned above, the '692 structure provides a structure for creating pre-loaded seals and to allow their operation. However, it does so by creating a two-step passageway through the valve. Such a passageway produces turbulence in the flow of the fluid passing therethrough, even to the degree that produces axial shock waves in the flow, and causes erosion of the parts at the step. Since the seals are located at the step, the seals carry the brunt of this adverse action and, hence, seal failure can result.

Therefore, it is a feature of the present invention to provide an improved ball member structure having pre-loaded seals wherein the ball member passage and housing passage are of equal inside perimeter dimension.

It is another feature of the present invention to provide an improved ball member passage and housing passage of equal dimension with a preloaded seal therebetween.

It is still another feature of the present invention to provide an improved mandrel for preloading seals in a ball valve structure having retractable surfaces, rather than fixed dimensioned shoulders, so as to allow a passage through the valve of uniform inside dimension.

SUMMARY OF THE INVENTION

A valve including a rotary ball member with a flow passage therethrough is mounted with respect to a housing or a housing insert having a flow passage of substantially equal dimension therewith. An annular recess is provided at either end of the rotary member passage for accommodating pre-loaded annular seals also having the same inside perimeter dimension. The seals are each provided with a cleft opening into the inside perimeter of the seal. When the rotary member rotates closed, the portions of the seals next to the rotary member are moved out of their respective recesses and in a direction axially away from the rotary member. This movement is allowed by the cleft. When the member is rotated open, the cleft opens as the displaced portion of the seal reconforms to the recess. The side of the seal away from the rotary member is constrained within the housing or housing insert and does not move axially.

To make such a valve assembly, a two-part ring mandrel is inserted through the seals and the rotary member passage to pre-load the seals. The external dimension of the mandrel is the same as the dimension of the passages of the rotary member and housing. In addition, a plurality of spaced apart fingers are pivotally mounted or slide mounted within slots in the mandrel to hold the seals in place during the molding step described below, thereby pre-loading the seals. Ideally, these fingers are urged outwardly by a compressible material within the slots; however, alternatively, the fingers can be manipulated outwardly by mechanical action.

The mandrel, ball member and pre-loaded seals are enclosed is an injection mold in which the housing or housing insert is formed by injection molding. The mandrel is removed after the molding step is completed, the fingers retracting in the process.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope, as the invention may admit to other equally effective embodiments.

In the drawings.

DESCRIPTION OF THE PREFERRED EMBODIMENTS

Figure 1:
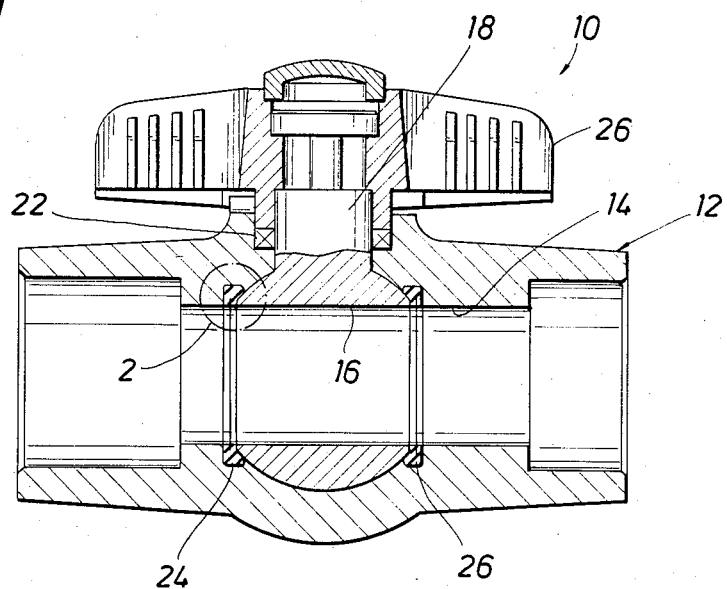
FIG. 1 is a horizontal cross-section of a preferred embodiment of a valve in accordance with the present invention.

Now referring to the drawings, and first to FIG. 1, a ball valve 10 in accordance with the present invention is disclosed in cross-section. Housing 12 of the valve has a passage 14 for fluid flow therethrough. Fluid may flow from left to right, from right to left or in both directions at different times depending on the specific use of the valve. Rotary ball member 14 having a spherical segment which rotates in a compatible spherical segment of the housing provides a passage 16 of substantially the same dimension as flow passage 14 when the rotary member is rotated to the open position, as shown in the drawing. An upward protruding extension 18 of the rotary member is connected to a handle 20 for providing the rotation. Seals 22 are provided between the housing and the upward extension to prevent leakage from occurring in the location of the seals.

Located between the rotary member and the housing are seals 24 and 26 at the opposite ends of the passage through the rotary member. The seals are located in respective annular recess surfaces at these locations, as explained more fully below. These seals are preferably made of Teflon or other yieldable material and provide a seal between the rotary member and the housing regardless of whether the position of the rotary member is in the open or closed position.

Figure 2:
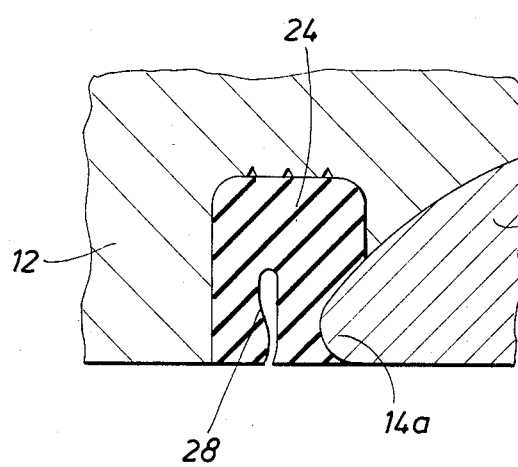
FIG. 2 is an enlarged partial cross-section of a seal in accordance with the present invention while the rotary member thereof is rotated to its open position.

Now referring to FIG. 2, it may be seen that surface 14a of the rotary member as it abuts the center passage has a sharper or smaller radius than the general radius of the sphere of member 14. Hence, an annular recessed surface is provided at that location around passage 16 whch is substantially the same as the recess surfaces discussed in U.S. Pat. No. 3,807,692, Usab, et al., issued April 30, 1974, which is incorporated by reference for all purposes.

Annular seal 24 is shown between rotary member 14 and housing 12 to permit sealing action at that location with respect to the surface of member 14 regardless of the position of rotary member 14. The inside perimeter of seal 24 is the same as the passage through the rotary member and the passage through the housing on either side thereof. A cleft 28 opens into the inside perimeter side of the seal.

Figure 3:
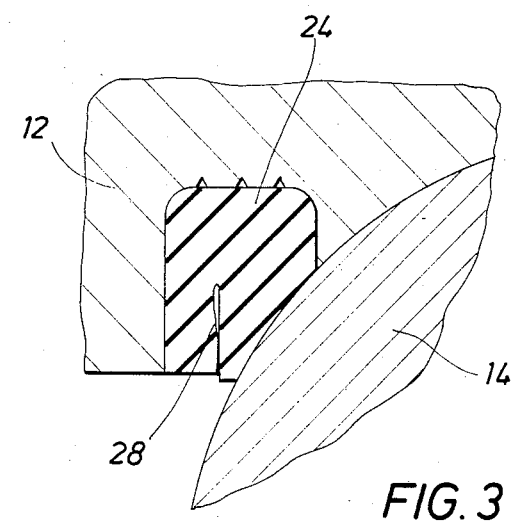
FIG. 3 is an enlarged partial cross-section of a seal in accordance with the present invention while the rotary member thereof is rotated to its closed position.
Figure 4:
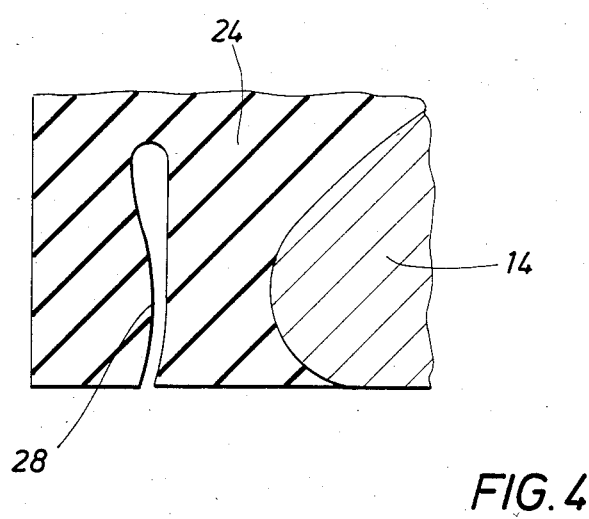
FIG. 4 is a further enlarged view of the cleft in the seal shown in FIG. 3.

FIG. 3 shows rotary member 14 rotated to the closed position and thereby flexing or pushing seal 24 in the vicinity of cleft 28 so as to permit that portion of the seal which is adjacent member 14 to move axially to the left. Such axially movement partially or completely closes cleft 28, which is better seen in the enlarged version shown in FIG. 4. Since seal 24 does not have a smaller inside perimeter than adjacent housing 12, the overall seal does not move in an axially direction. Rotating the rotary member to the open position causes the seal to flex open at the cleft, thereby sealing against the annular recessed surface 14a, as shown in FIG. 2.

Hence, a seal is provided which effectively seals regardless of the position of the rotary member and allows the housing and rotary member to have passages that are substantially the same dimension, which has not been true in the prior art, such as in U.S. Pat. No. 3,807,692.

Figure 5:
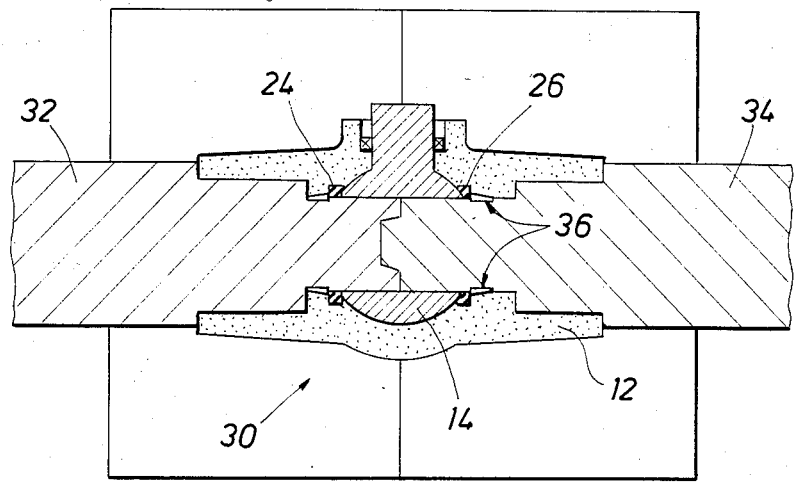
FIG. 5 is a horizontal cross-section of a mold and other related parts during the procedure of making the housing of a preferred embodiment of the invention.

Now referring to FIG. 5, a procedure is provided for injection molding of the housing while also providing preloading of the seals. Mandrel 30 includes a left section 32 and a right section 34 which join or mate together within passage 16 of ball member 14. The outside perimeters of the mandrel left and right sections on either side of the passage of the ball member are slightly smaller than the passage through the ball member so that they can fit through the passage. Seals 24 and 26 are preloaded onto the ball member using retractable fingers 36 on the mandrel sections. The retractable fingers are pivotally mounted or slide mounted for operation within suitable slots spaced at regular intervals circumferentially around the mandrel sections. These alternate embodiments are shown in the enlarged views of FIG. 6 and FIG. 7, respectively, and are described below in more detail. Four fingers or more are preferred. These slots are preferably filled with compressible material for urging the fingers in an outwardly direction so that the seals are held in place while also forcing the seals to ride up the spherical surface of the ball member to a slight degree. This stretches the seals which start out with their perimeter dimensions being slightly smaller than the passage dimension and thereby results in pre-loading. The pre-loaded seal perimeter dimension is substantially equal to the passage dimension. Although a suitable compressible or resilient material, such as rubber, is preferred as the means for outwardly biasing the fingers, a small spring in each slot can be used. The fingers can be operated alternatively or supplementally by mechanical means such as by tapered rods sliding through appropriate channels from the parted ends or outside ends of the mandrel sections.

Figure 6:
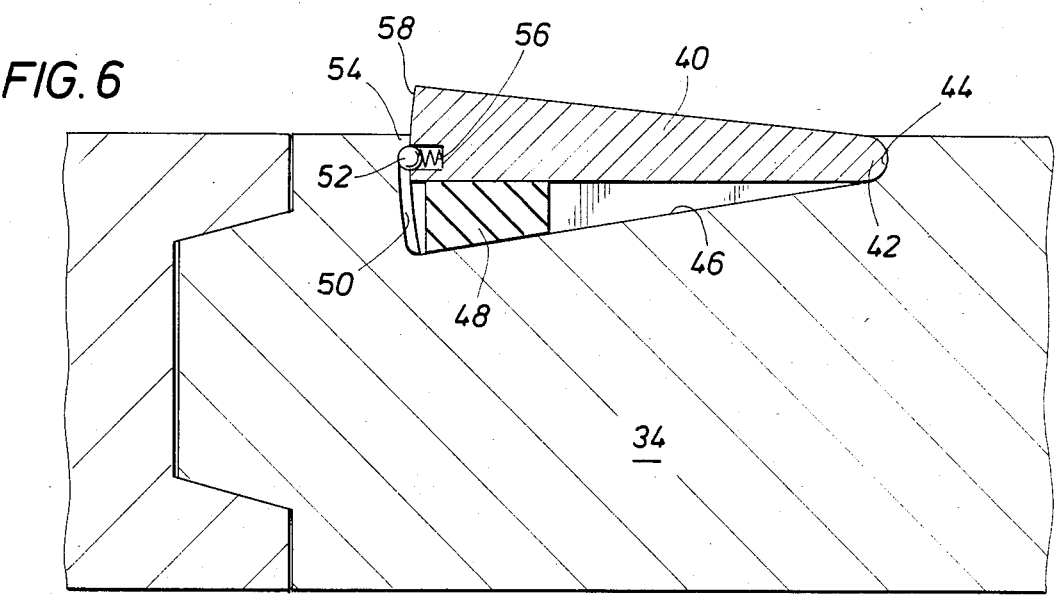
FIG. 6 is an enlarged cross-sectional view of a slide-mounted retaining finger in accordance with a preferred embodiment of the invention.

Now referring specifically to FIG. 6, an embodiment of a mandrel is shown wherein a finger 40 is pivotally mounted at the right side by having a spherical surface 42 rotating within a cup 44 of like dimension built into accommodating slot 46 in the mandrel. The slot end is tapered so that its dimension at the left is larger than on the right; however, the larger end of the slot is larger than the larger end of the finger.

A resilient or compressible material 48 is located under the enlarged end of the finger to urge the finger outwardly from the slot. A spring could be used instead. A generally arcuate groove in the enlarged end of the slot provides a course for a ball 52 to ride in as the finger pivots until it is stopped by lip 54. Ball 52 is located in a axial hole in the end of the finger and is urged outwardly therefrom by spring 56.

End 58 of finger 40 provides the contact of the finger to seal 26 to pre-load the seal during molding process. When the plastic is injected into the mold, there will be some pressure applied to push the finger down. However, the outward urging of spring 56 on ball 52 and the outward pressure applied by material 48 are sufficient to keep the finger rotated outwardly to hold the seal during molding and to resist retraction by the injection molding of the liquid plastic.

Upon completion of the molding procedure, including the solidification of the housing in contact with the housing, the sections of the mandrel are pulled apart. At this time, the force applied inward on the finger is sufficient to overcome the combined pressures provided by spring 56 and material 48 so that the mandrel sections can be completely disassembled from the mold.

Figure 7:
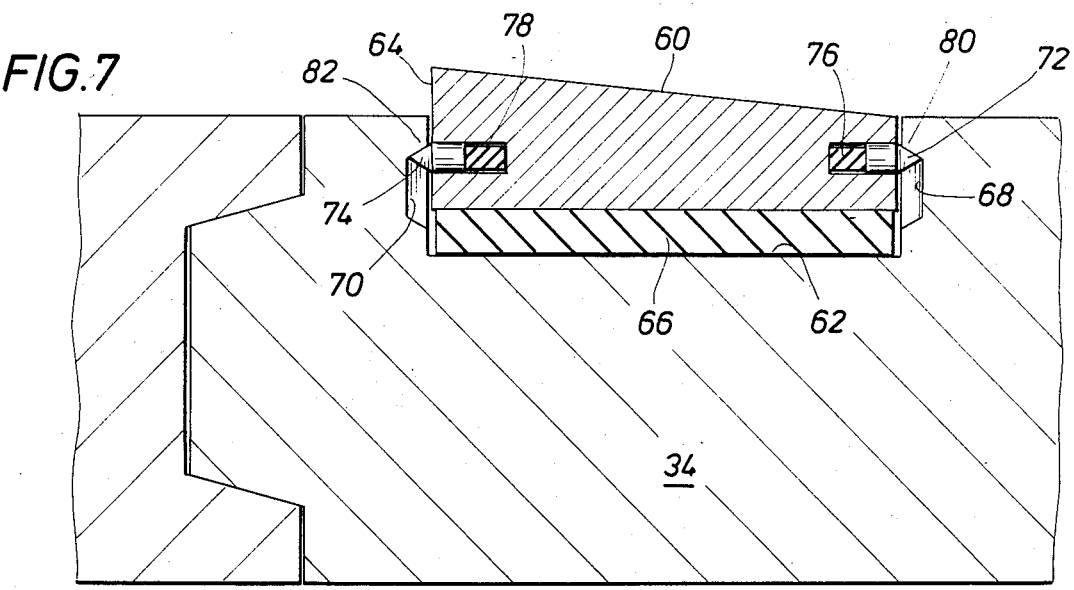
FIG. 7 is an enlarged cross-sectional view of a pivotally mounted finger in accordance with another preferred embodiment of the invention.

Referring now to FIG. 7, an alternate finger assembly to that just described is shown. Finger 60 is slidably mounted for radial movement with respect to slot 62. The finger and slot dimensions are such that an end 64 is provided radially outward of the surface of the mandrel section for holding seal 26, as described above, when the finger is pushed outward by compressible material 66. Radial grooves 68 and 70 are provided in the ends of slot 62 as courses for pins 72 and 74, respectively, operating axially within holes in the respective ends of the finger. Compressible material or springs 76 and 78, respectively, provide outward urging of the pins within the grooves. Shoulders 80 and 82 are provided at the outward limit of grooves 68 and 70, respectively, to provide the radial outward limits for pin travel within the grooves.

As with the embodiment of FIG. 6, the pressure applied to the finger during injection of the liquid plastic into the mold is insufficient to overcome the outward pressure resulting from material 66 and springs 76 and 78. Therefore, end 64 remains in contact to hold the seal in place. However, after the molding has taken place and the plastic has hardened, the finger is pushed inwardly as the mandrel sections are pulled apart during disassembly.

FIG. 6 and FIG. 7 each only show one finger located on the right section of the mandrel respectively illustrated. Fingers of similar, but reverse orientation, are employed in the opposite mandrel section in each case to hold seal 24 in place during the injection molding step.

Housing 12 is made by injecting plastic in its liquid state through an inlet port on the mold, which is not shown in the drawing, and which fills the area 12. It may be seen that the housing takes on the same shape as the housing 12 shown in FIG. 1 and includes annular grooves for accommodating the seals between the housing and the rotary member for operation in the manner previously described.

When the plastic is solidified or hardened, the parts of the mold are separated and the mandrel sections are disconnected, leaving the seals in place in the manner described above.

In the embodiment that has been described, it is assumed that the housing is adjacent the ball and that the seals operate between the housing and the ball member.

It is possible to use the same techniques for providing preloaded seals in a ball valve employing one or more annular inserts or rings on either side of the ball member within an exterior housing, if desired. In such event, the flow passage through such annular inserts would be substantially the same dimension as the flow passage through the ball member and the seals would be preloaded within the inserts and the ball member.

While several embodiments of the invention have been generally described, it will be understood that the invention is not limited thereto. Many modifications may be made and will become apparent to those skilled in the art. For example, it may be desirable to have a seal only on one side of the ball member, rather than both sides.

What is claimed is:

1. A rotary valve, comprising
    a rotary member having
        an outer surface forming at least a segment of a sphere,
        a passage through to opposite sides of the segment, and
        an annular recessed surface in the segment abutting and surrounding one end of the passage,
    a flow passage member adjacent to said rotary member comprising at least a segment of a sphere in slidable contact with the segment of the sphere of said rotary member, the flow passage of said flow passage member being aligned with said rotary member passage when said rotary member passage is in its open position, said flow passage of said flow passage member having an inside perimeter no larger than the inside perimeter of said rotary member passage, and
    a resilient annular seal rigidly affixed between said rotary member and said flow passage member with its inside perimeter being substantially the same dimension as said flow passage of said flow passage member, said seal having an inside perimeter cleft which allows axial closing flexing thereof when said rotary member is rotated to its closed position and allows axial opening flexing of said seal into said annular recessed surface when said rotary member is rotated to its open position.

2. A rotary valve in accordance with claim 1, wherein said flow passage member is the valve housing.

3. A rotary valve in accordance with claim 1, wherein
    said rotary member includes a second annular recessed surface in its sphere segment abutting and surrounding the other end of its passage, and including
    a second resilient annular seal rigidly affixed between said rotary member and said flow passage member with its inside perimeter being substantially the same dimension as said flow passage of said flow passage member, said second seal having an inside perimeter cleft which allows axial closing flexing thereof when said rotary member is rotated to its closed position and allows axial opening flexing of said second seal into said second annular recessed surface when said rotary member is rotated to its open position.

* * * * *